Jan. 21, 1964
C. B. MILES ETAL
3,118,734
FLUID BED METHOD OF PRODUCING PHOSPHORUS
Filed Nov. 27, 1961
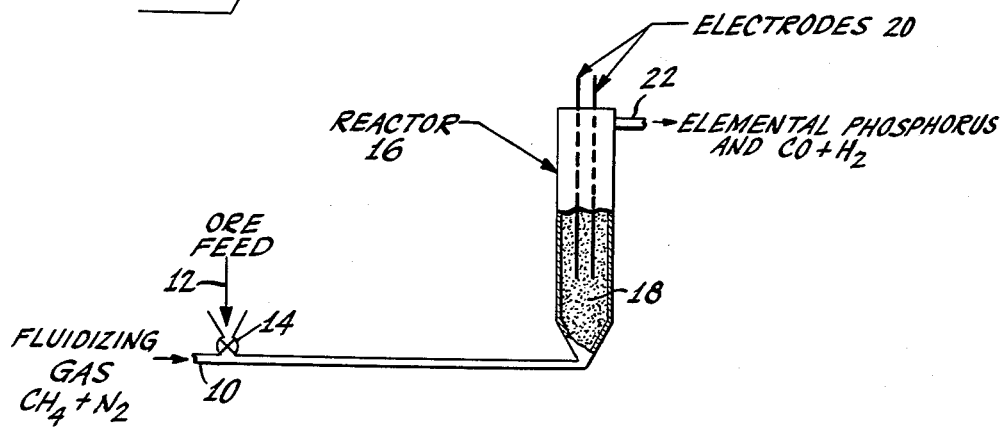
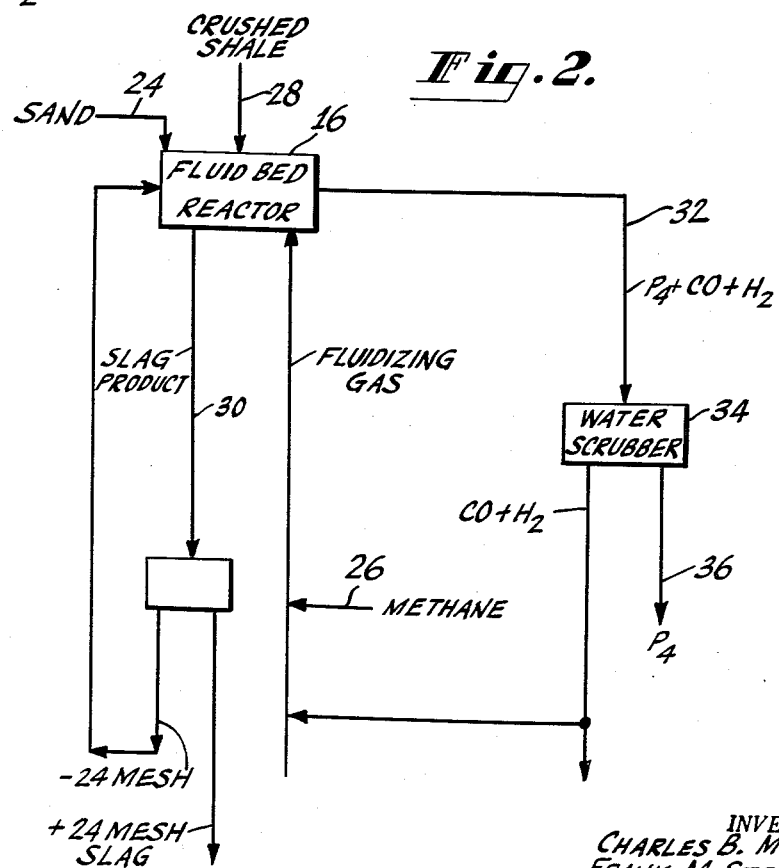
INVENTORS
CHARLES B. MILES &
FRANK M. STEPHENS, JR.
BY
ATTORNEY 3,118,734
FLUID BED METHOD OF PRODUCING
PHOSPHORUS
Charles B. Miles, Westfield, N.J., and Frank M. Stephens, Jr., Columbus, Ohio, assignors, by direct and mesne assignments, to FMC Corporation, New York, N.Y., a corporation of Delaware
Filed Nov. 27, 1961, Ser. No. 155,019
7 Claims. (Cl. 23—223)

This invention relates to the manufacture of phosphorus from certain phosphatic shales, and more particularly to the production of phosphorus from these shales in a fluidized bed maintained within an electrically heated furnace.

Typical phosphatic shales found in the western section of the United States comprise about 23 to 27% of $P_2O_5$, 34 to 37% of CaO, 20 to 25% of $SiO_2$, 3 to 4% of $Al_2O_3$, and 1% to 2% of $Fe_2O_3$. These ores are not sufficiently rich to be economically treated by conventional wet processes to form phosphatic fertilizers, but can be used for the production of phosphorus by heating with a carbonaceous reducing agent, preferably in an electric furnace.

In one type of electric furnace the ore is introduced along with coke particles into the furnace and heated until phosphorus vapor is evolved. The coke serves both as a reactant in the phosphate-reducing reaction and for conducting electricity through the bed. Heating is carried out by passing an electric current through the coke-containing feed mixture by means of conductive electrodes. The ore is heated until molten bed composed principally of slag, that is calcium silicate and ferrophos, is formed and all of the phosphate values have been recovered. The phosphorus and carbon monoxide products which are given off are recovered overhead in gaseous form.

The molten slag and ferrophos produced in this reaction are difficult to recover. That is, the molten residue must be removed from the reaction furnace and permitted to cool and solidify, and then must be broken mechanically for disposal.

Other disadvantages of this process are that large amounts of coke, up to 9 tons per ton of phosphorus produced, must be employed in order to supply the electrical conductivity required for resistant heating of the charge. By way of comparison, only about 1 ton of carbon is theoretically necessary for producing 1 ton of phosphorous. Since the reaction residue which results is a fused mass, coke recovery becomes impractical. Further, the introduction of fines in the feed charge causes erratic operation of the furnace.

Attempts have been made to overcome these difficulties by treating the phosporus ore in a fluid bed along with coke. In one process the fluid bed is heated by passing a hot gas upward into the bed. This system has not been found to be feasible because excessive volumes of heated gas are required to provide the heat requirement necessary to volatilize the phosphorus. Other attempts to heat the fluidized bed by passing an electric current through the fluidized particle by means of conductive electrodes also have given rise to serious problems. Among these is the high amount of coke, i.e., up to 9 tons of coke per each ton of phosphorus, which must be provided in order to have sufficient electrical conductivity to heat the bed.

Further, the fluidized bed must be heated to at least about 1100° C. in order to evolve the phosphorus. At these temperatures, the excess coke required to permit electrical resistance heating of the fluid bed sticks to the sofe ore particles, resulting in a fused slag. Economic recovery of the coke from the fused slag becomes impossible, resulting in the loss of large quantities of non-reacted coke.

Another problem encountered in treating phosphorus ore in a fluid bed relates to the problem of sticking or self-agglomeration. In a fluidized bed system, the particles being fluidized are constantly in motion and undergo a continuing series of contacts with each other. For this reason, it is normally difficult or impossible to fluidize any material that becomes sticky or soft while being treated, because the particles tend to stick together and form one single, large piece, which cannot be fluidized. In treating the present phosphate ores, the particles soften at about 1100° C. and when heated within the required reaction temperatures of about 1100° C. to 1300° C. they normally tend to fuse and agglomerate.

It is an object of the present invention to provide a process of reducing phosphate-containing western shales to provide elemental phosphorus within a fluidized bed which is heated by passing an electric current through the bed.

It is an additional object of the present invention to provide a process for reducing such phosphate-containing ore to provide phosphorus within a fluidized bed operating at a temperature of about 1100° C. to 1300° C. without uncontrolled agglomeration of the feed particles.

It is further an object of the present invention to provide a process of reducing such phosphate-containing ore to provide phosphorus, within a fluidized bed, such that the slag residue from the reduction is free of excessive amounts of carbonaceous reactants and is in particulate form, in which state it may be readily handled.

It has been found unexpectedly that phosphorus can be obtained from phosphorus-containing western shales in a fluidized bed without uncontrolled agglomeration by feeding —10 Tyler mesh ore into a fluid bed maintained at a temperature of about 1100° C. to 1300° C., fluidizing the bed with a fluidizing gas, adding a hydrocarbon containing gas to the bed, cracking the hydrocarbon within the fluid bed to provide the ore particles with a coating of carbon derived from the cracked hydrocarbon in the amount of about 15% to 25% of the weight of the bed, supplying electrically produced heat to the bed by means of electrodes disposed within the fluid bed, and recovering phosphorus and cracked by-products overhead in gaseous form.

The ability of small amounts of reducing gas to provide the required electrical characteristics to the bed for resistance heating, as well as sufficient carbon for reduction of the ore, is quite surprising. It would normally be expected, in view of the prior work with coke, that much larger amounts of carbon would be required for these purposes.

In the present process, the ore particles are maintained in a fluidized state. That is, the bed of ore particles are suspended in a stream of up-flowing gas which maintains the particles in a turbulent bed, resting only on a rapidly moving gas stream. These fluidized ore particles are coated with finely divided carbon derived from cracked hydrocarbon gases.

The carbon coating is applied to the ore particles by cracking a hydrocarbon gas in the presence of the ore particles. This is most conveniently done by passing a hydrocarbon containing gas along with the fluidizing gas into the fluidized bed and cracking the hydrocarbon gas in situ at the operating temperatures of the bed. The liberated carbon uniformly coats the surface of the bed particles with a layer of finely divided carbon.

The carbon must be present on the surface of the ore particles in amounts sufficient to reduce all of the phosphorus contained in the ore feed to elemental phosphorus. The liberated gaseous phosphorus is recovered overhead by condensation in suitable apparatus, i.e., direct water spray condensers. The feed particles which are stripped of their phosphorus values are recovered as particulate slag from the fluidized bed.

In addition to the carbon required for the chemical reduction of the phosphorus, enough carbon must be present in the fluidized bed to render it electrically conductive so that the bed can be heated by electrical resistance heating. The amount of carbon required to accomplish these dual purposes is about 15% to 25% of the weight of the bed. Heating is accomplished by passing an electrical current through electrodes immersed in the fluidized bed. The resistance to the electrical flow through the electrodes by the fluidized bed results in heat being liberated within the bed.

The fluidized bed is heated in this manner to about 1100° C. to 1300° C. Within this temperature range, the phosphorus is liberated from the ore at an acceptable rate. Temperatures below 1100° C. result in too slow a liberation of phosphorus and are not desirable. Temperatures above 1300° C. result in rapid liberation of phosphorus from the ore particles but is not suitable since rapid agglomeration of the bed particles takes place, resulting in a bed which is difficult to control.

When temperatures of about 1100° C. to 1300° C. are employed, the feed particles within the bed become plastic or semi-molten, and therefore, become quite sticky. When in this state, the sticky particles pick up fine ore particles which are introduced with the ore feed. The larger agglomerates within the fluid bed, even though they are somewhat plastic, do not tend to stick together because the smooth and uniform carbon coating surrounding the particles, coupled with their high momentum relative to the fine particles, discourages normal tendency of these particles to stick together.

The fluidized bed particles normally range from 4 to 325 Tyler mesh. This size distribution permits the bed to constantly grow larger sized fluidized particles through self-agglomeration, and therefore, to perpetuate itself.

The ore feed to the fluidized bed should be maintained at −10 Tyler mesh. When ore feeds of this size are introduced into the fluidized bed, the particles instantly soften and adhere to fluid bed particles, thereby continuing the agglomeration process and continuity of the fluidized bed. Particles which are larger than −10 Tyler mesh would not tend to adhere to the surface of the hot fluid bed particles, and therefore, would be blown out of the system by the fluidizing gas. If the particles were materially greater than the size of the fluidized bed particles, they would be too heavy to be supported by the fluidized gas and would drop to the bottom of the bed and be withdrawn with the slag before their phosphorus values could be volatilized.

A preferred practice of the present process will now be illustrated with reference to the drawings, in which FIG. I represents an apparatus for conducting the process on a laboratory scale, and FIG. 2 represents a flow sheet for a continuous process in accordance with the invention.

Referring now to FIG. I, fluidizing gas, which may be a mixture of methane or other gaseous hydrocarbons and nitrogen, or mixtures of these or similar gases with carbon monoxide or hydrogen, is fed into the system at 10 and mixed with ore feed 12 introduced through hopper 14. This mixture of gas and particulate feed is introduced into the bottom of a vertical fluid bed reactor 16, and passed into bed 18 of fluidized particles therein. Electrodes 20 provide electrical energy for resistance heating through the bed. The phosphorus and other gaseous products resulting from the reaction are removed from the system through gas outlet 22, and are passed to suitable recovery units where they may be separated into phosphorus and such other useful gaseous products as carbon monoxide and hydrogen.

The fluidized bed 18 in this system normally is established initially by introduction of particles of silica sand, metallurgical coke, slag particles and the like having particle sizes within the here stated range. Electrical conductivity in the bed is provided initially either by carbon introduced from cracking of a proper hydrocarbon gas, or in the form of carbon particles. The bed employed as a starter serves as a basis for introduction of ore feed, in which the feed may be raised to a suitable temperature and may be provided with a carbon coating through reduction of the feed gas.

In FIG. 2 the continuous operation of a preferred continuous process in accordance with this invention is described in the form of a flow sheet. The starter bed in reactor 16 is established by introduction of silica sand 24 and methane 26, which are heated to provide a conductive carbon-coated sand bed. Shale 28 is fed into the reactor 16 along with further methane gas on a continuous basis. Particulate slag product 30 is removed continuously from the bed at a rate to maintain the proper bed level. The finer (−24 mesh) particles of slag, that is calcium silicate containing small amounts of other nongaseous components of the bed may, if desired, be recycled, with large particles (+24 mesh) being discarded. Gaseous products 32 from the bed, comprising in this case phosphorus, carbon monoxide, and hydrogen are passed to a water scrubber 34 where phosphorus 36 is extracted and removed. The carbon monoxide and hydrogen gases 38 then may be recycled as fluidizing gas along with further hydrocarbon gas to the fluid bed reactor, or they may be recovered and employed as fuel or in other processing.

The fluidized bed is composed of particles of bed materials within the size range of about 4 to 325 Tyler mesh. It is preferred that the particles vary in size within the above range in order to have a distribution of fine and coarse particles in the bed so that the finer particles can grow in size through self-agglomeration, thereby continually replacing the larger bed particles which are withdrawn from the bed as residue. Optimum operation of the fluidized bed depends upon a sufficient size distribution within the bed, in order to perpetuate production of fluid bed sized particles from smaller feed nuclei. It is preferred that the bed particles cover a range of about 2 to 6 Tyler mesh grades.

The bed particles must neither be too fine nor too large, despite the fact that some size distribution is necessary. In this respect, if the material in the bed is too fine, i.e., on the order of −325 mesh, the bed material has a tendency to fuse together into extremely large particles until it forms a solid mass. On the other hand, if the bed particles are all to coarse electrical conductivity is not uniform; channeling tends to occur in the bed and fluidization becomes erratic with dead spots in the bed. The particles in these dead spots fuse into large agglomerates too coarse in size to be supported by the fluidizing gas and drop out of the bed. Typical examples of particle size distribution within operating fluid beds are given below:

| Tyler Mesh Size | Weight Percent | |
|---|---|---|
| | Bed No. 1 | Bed No. 2 |
| +4 | 3.1 | 10.7 |
| −4 +10 | 24.6 | 36.3 |
| −10 +28 | 13.4 | 12.8 |
| −28 | 58.9 | 40.2 |

In operation, the bed normally is started by fluidizing inert particles, for example, metallurgical coke, silica sand, or calcium silicate, or mixtures thereof, within the herein particle size range. Initial heat may be provided externally or if the starter bed has electrical characteristics, by means of resistance heating. If the bed is not initially conductive, it is made conductive by deposition of carbon from methane or other hydrocarbon gas or by introduction of a small amount of metallurgical coke. The provision of a starter bed makes it possible to obtain proper initial fluidization and to obtain the proper operating temperature before introduction of ore feed. Materials such as −10 mesh silica sand, −24 mesh calcium silicate and metallurgical coke 50% −10+35 mesh, 50% −35 mesh, have been found suitable.

Heat is provided to the bed electrically by resistance of the bed to conduction of electricity. While auxiliary heating means may be employed, for example, preheating of the fluidizing gases and/or particulate feed to a proper temperature, or application of external heat to the reactor, the electrical resistance heating means provides the major source of heat. The electrical system employed may be a two or three-phase alternating current system, preferably employing graphite electrodes. The composition of the electrodes is not critical provided that they are inert to the system.

Power loadings employed with a 4-inch diameter bed have been found to be about 1 to 3.5 kva., at a voltage of about 50 to 220 volts. It is important only that the bed be maintained at the proper temperature, and it will be obvious that the electrical requirements will vary with the size of the bed and the rate of feed, and with its degrees of fluidization and conductivity.

The temperature of the bed is maintained at about 1100° C. to 1300° C. At these temperatures, the bed particles are sufficiently plastic and sticky so that any fines which are introduced with the feed instantly adhere to the surfaces of the coarser bed particles. Thus the size consist of the bed particles is self-adjusting, as long as the feed consist is maintained below −10 Tyler mesh. The ability of the finely divided −10 Tyler mesh feed to undergo agglomeration in the fluidized bed is based on operating the bed near the softening point of the materials treated. The degree of softening or stickiness of the bed is controlled by close regulation of the bed temperature. At temperatures below about 1100° C., the phosphorus liberation is slow, and the bed particles do not soften sufficiently for the fines in the feed to attach themselves to the surface of fluidized particles. As a result, minimal agglomeration takes place and sizable amounts of the feed charge which do not stick to the bed particles are carried off overhead from the bed by the fluidizing gas. Above about 1300° C., the bed particles become too sticky and adhere to each other, resulting in severe fusion of large numbers of bed particles. The resulting agglomerates become too heavy for the fluidized bed and eventually defluidize the bed.

When the fluidized bed of the present process is operated at temperatures of about 1100° C. to 1300° C., the bed particles do not stick to each other. The agglomeration which takes place within the bed is the result of feed fines adhering to the surface of the agglomerates in the fluidized bed. Agglomeration of the particles continues until the particles become too dense to become fluidized within the bed. The agglomerate residue which is removed is chiefly calcium silicate which is formed during the chemical reduction of the phosphate to phosphorus. The melting point of calcium silicate is above 1300° C., and therefore, the residue remains in particulate form in which state it can be readily treated for removal and recovery.

The reducing gases employed herein must provide carbon on reduction, in order to coat the bed particles with carbon. This has been found to be a very efficient way to introduce carbon into the system. By this means, large excesses of carbon are not required as is the case when coke particles are used as a source of carbon. The amount of carbon which is introduced is generally somewhat in excess of the stoichiometric amounts required for reaction with the phosphorus. Because of the intimate contact between the deposited carbon and the ore feed, extremely efficient reduction is provided and this amount of carbon is sufficient to provide electrical conductivity for resistance heating of the bed.

The preferred method of coating the bed particles with carbon is to introduce a hydrocarbon gas into the fluidizing gas stream. In this manner the hydrocarbon gas is carried into the fluid bed and cracked in situ at the fluid bed temperature, thereby providing the ore particles with a coating of carbon.

The carbon-yielding reducing gas must be used in sufficient quantities to provide the bed with about 15% to 25% of carbon. This amount of carbon is required to provide proper conductivity for resistance heating and to reduce all of the $P_2O_5$ in the ore. Amounts in excess of 25% of carbon detrimentally overcoat the bed particles with carbon and should be avoided.

Useful hydrocarbon gases which may be included in the fluidizing gas include aliphatic hydrocarbons such as methane, ethane and propane. Other reducing gases such as hydrogen or carbon monoxide may be employed with the aliphatic hydrocarbons in an amount which provides for the reduction of all of the $P_2O_5$ in the ore. These gases are mixed with sufficient nitrogen or other inert gases which provide a proper gas flow for fluidization.

The velocity of the fluidized gas for a 4-inch O.D. fluidized bed have been found to be about 1.2 and 2.2 feet/second. This velocity would be modified depending upon the size and structure of the fluidized bed in a manner known to those skilled in the art. The velocity of the fluidized gas should be regulated so that the density of the bed is about 60% to 75% of the bulk density of the material being fluidized. This density is provided readily with bed particles as described above. Typical ratios of reducing gases to inert gases will be about 5% to 40% of the reducing gases to about 95% to 60% of the inert gas. It is possible to use 100% reducing gas in the system only so long as the $P_2O_5$ and carbon contents are in balance. In many fluidized beds, however, restriction on the heat input and feed rates dictate using from 60% to 90% inert gas.

The following examples are presented by way of illustration only and are not deemed to be limitative of the present process.

*Example 1*

1500 grams of −10 Tyler mesh silica sand was introduced into the fluid bed reactor shown in FIGURE 1, and fluidized by passage therethrough of a gas mixture of 90% of nitrogen and 10% of methane, at a rate of 1.5 s.c.f.m. Heat was applied externally to crack the methane and coat the sand particles. The heating was continued until the particles were coated uniformly with carbon, and the electrodes were capable of maintaining a temperature of 1200° C. in the bed through resistance heating of the coated particles. Thereafter, an ore comprising 23.7% $P_2O_5$, 34.7% CaO, 24.6% $SiO_2$, 3.9% $Al_2O_3$ and 1.5% $Fe_2O_3$, and having the following particle size consist:

| Tyler screen fraction: | Weight percent |
|---|---|
| −10+14 | 8.84 |
| −14+20 | 11.05 |
| −20+28 | 9.39 |
| −28+35 | 8.84 |
| −35+48 | 9.12 |
| −48+65 | 9.39 |
| −65+100 | 9.67 |
| −100+150 | 6.91 |
| −150+200 | 6.08 |
| −200+270 | 7.18 |
| −270+325 | 7.18 |
| −325 | 6.35 | was fed to the system through the entry port at a rate of about 460 grams per hour, along with the above gas which was introduced at a superficial velocity of about 1.3 feet per second.

The temperature of the bed was maintained at about 1200° C. by electrical heating, the system being operated at about 50 volts and 3 kva. Phosphorus gas was recovered at the gas outlet port in the amount of 75% of theory; carbon monoxide and hydrogen were also recovered. The $P_2O_5$ to CaO ratio of the feed was about 0.635, and in the final bed was about 0.159, which indicated excellent recovery of phosphorus from the bed. The operation ran smoothly with no excessive agglomeration of particles, and essentially no fines were observed at the outlet port of gases, indicating that they were picked up by the relatively larger, sticky, bed particles.

*Example 2*

The procedure of Example 1 was repeated, with the exception that it was conducted at about 1100° C. In this case, 20% of theory of phosphorus was recovered, and some fines were observed to come over with the gaseous products. The ratio of $P_2O_5$ to CaO in the feed was about 0.734, and in the product was about 0.594. Phosphorus was produced at this temperature, but at a relatively low efficiency. Furthermore, there was insufficient plasticity in the bed particles to pick up all of the fines, with the result that some, although not an excessive amount, of fines evolution interfered with this phosphorus and other gaseous product recovery.

*Example 3*

The procedure of Example 1 was followed, in this case at a temperature of about 1300° C. The phosphorus yield obtained was about 53% of theory, the $P_2O_5$ to CaO ratio in the feed being 0.585 and in the product being 0.274. In this case, some fusion of the bed occurred, with the result that a fair number of large particles, outside the preferred mesh range, were obtained. While the process is operable, and provided a fairly efficient phosphorus yield, it was near the temperature point where excessive bed fusion would occur.

*Example 4*

The procedure of Example 1 was repeated with the exception that ethane was employed in place of methane. Phosphorus yields comparable to those of Example 1 were obtained and the process operated smoothly with neither excessive agglomeration nor excessive fines elimination.

*Example 5*

The procedure of Example 1 was repeated with the exception that propane was employed in place of methane. Phosphorus yields comparable to those of Example 1 were obtained and the process operated smoothly with neither excessive agglomeration nor excessive fines elimination.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of producing phosphorus from phosphatic shales which comprises feeding —10 Tyler mesh phosphatic shale particles into a fluid bed having particle sizes of about 4 to 325 Tyler mesh, said bed containing electrodes immersed therein, heating said bed to a temperature of 1100° to 1300° C. by maintaining an electric current through said fluid bed by means of said electrodes, passing a hydrocarbon gas in contact with said ore particles, cracking the hydrocarbon gas within said fluid bed to provide the shale particles with a coating of carbon derived from the cracked hydrocarbon in the amount of about 15% to 25% of the weight of said fluid bed, evolving phosphorus gas and other products overhead and forming particulate calcium silicate within said fluid bed, removing the particulate calcium silicate, and recovering said gaseous products.

2. Method of claim 1 in which the reducing gas comprises an aliphatic hydrocarbon having 1 to 3 carbons.

3. Method of claim 2 in which the bed has a particle size distribution of 2 to 6 adjacent Tyler mesh grades.

4. Method of claim 3 in which the carbon-yielding, reducing gas is methane.

5. Method of claim 3 in which the carbon-yielding, reducing gas is ethane.

6. The method of claim 1, in which a portion of the removed particulate calcium silicate is returned to the fluidized bed to maintain the level and the desired particle size distribution of said bed.

7. The method of producing phosphorus from phosphatic shales which comprises adding a charge of about —10 Tyler mesh inert particles into a fluidizing stream to form a fluid bed, heating said particles to a temperature of from about 1100° to 1300° C., passing a hydrocarbon gas in contact with said heated inert particles, cracking said hydrocarbon gas on contact with said heated inert particles within said fluid bed to provide carbon, said carbon forming a coating on said heated inert particles and making said fluid bed electro-conductive, introducing —10 Tyler mesh phosphatic shale particles into said fluid bed having particle sizes of about 4 to 325 Tyler mesh, maintaining electrodes immersed in said fluid bed, heating said bed to a temperature of from about 1100° to 1300° C. by passing an electric current through said fluid bed by means of said electrodes, passing a hydrocarbon gas in contact with said shale particles, cracking the hydrocarbon gas to form carbon within said fluid bed and providing said shale particles with a coating of carbon in the amount of about 15% to 25% of the weight of said fluid bed, evolving phosphorus gas overhead and forming particulate calcium silicate within said fluid bed, removing said particulate calcium silicate and recovering said overhead gaseous product.

References Cited in the file of this patent

UNITED STATES PATENTS

| | | |
|---|---|---|
| 1,938,557 | Gooch et al. | Dec. 5, 1933 |
| 2,509,228 | Hardin | May 30, 1950 |
| 2,860,037 | Kamlet | Nov. 11, 1958 |
| 2,967,091 | Robertson | Jan. 3, 1961 |
| 2,974,016 | Horton et al. | Mar. 7, 1961 |
| 3,025,140 | Schreiner et al. | Mar. 13, 1962 |
| 3,026,181 | Schreiner et al. | Mar. 20, 1962 |